Dec. 20, 1960 R. C. BERGHELL 2,965,169

TABULATING CARD REPRODUCING PUNCH

Filed Sept. 30, 1957 2 Sheets-Sheet 1

INVENTOR.
ROBIN C. BERGHELL
BY Fulwider, Mattingly & Huntley
Attorneys

Dec. 20, 1960 R. C. BERGHELL 2,965,169

TABULATING CARD REPRODUCING PUNCH

Filed Sept. 30, 1957

2 Sheets-Sheet 2

INVENTOR.

ROBIN C. BERGHELL

BY Zuluider Mattingly & Huntley

Attorneys

United States Patent Office 2,965,169
Patented Dec. 20, 1960

2,965,169

TABULATING CARD REPRODUCING PUNCH

Robin C. Berghell, Los Angeles, Calif.

Filed Sept. 30, 1957, Ser. No. 687,015
22 Claims. (Cl. 234—59)

The present invention relates generally to apparatus for recording and handling statistical data and more particularly to apparatus of that type in which the data are recorded on punched cards.

The use of punched-card and allied tabulating and computing machines has greatly facilitated the rapid and accurate handling of large quantities of statistical data. Such machines are in wide use, for example in bookkeeping, accounting, labor distribution and manufacturing control and the methods employing such equipment not only effect a great savings in time but eliminate many opportunities for human error.

Various machines have been proposed in the past for providing punched cards which contain data from several sources. One such machine is shown and described in the present inventor's co-pending U.S. patent application Serial No. 452,076, filed August 25, 1954, which issued on October 1, 1957, as Patent No. 2,808,107, and of which the present application is a continuation-in-part.

Data-transferring operations wherein data from various sources are combined and recorded upon a single tabulating card, are not only time consuming but leave a very substantially opportunity for human error. The use of a machine of the type described in the above-referenced patent application, would do much to shorten the time involved in accumulating data and reducing the error content of records formed. This particular machine operates by a number of pins being set in accordance with various master cards or other information sources, and then moving to punch holes in a single card indicative of the data taken from several sources. In a machine of this type, it is necessary to selectively hold certain of the spring-mounted pins in a non-punching position. The force necessary to hold the spring-mounted pins coupled with the force required to punch holes in a record card becomes substantial. Therefore, in certain applications, it may be desirable to reduce the magnitude of the force which must be exerted to perform a punching operation.

In certain card-punching machines, of the type described in the above-referenced patent application, it is desirable to punch certain variable data in a card. The variable or changing data may be provided in the form of electrical signals which may be used to control various apparatus, e.g. solenoids, which in turn control the pins of the punch. In controlling the pins according to electrical signals, it is desirable that the pins be positively engaged by a somewhat rigid member.

If pins are controlled directly by solenoids, the force that may be imparted to the pins is somewhat limited, and the action is not as fully positive as might be desirable in certain applications.

Bearing in mind the above-mentioned considerations, it is a major object of the present invention to provide an improved form of a simple data-recording unit that may be used to form a permanent record of data accumulated from several sources.

It is another object of the present invention to provide an apparatus for producing a punched card carrying data from several sources, wherein relatively small forces are required during the punching operation.

It is still a further object of the present invention to provide an improved apparatus for setting the pins in a punching apparatus according to variable or changing data.

Another object of the present invention is to provide apparatus wherein the pins of a punch are rigidly supported in certain predetermined positions.

A still further object of the present invention is to provide a lock-latch mechanism for providing positive engagement between portions of a taubulating-card punch during certain intervals of operation to thereby reduce the forces required during the punching operation.

The foregoing and additional objects and advantages of the invention will appear from the following detailed description of the illustrative embodiment, consideration being given also to the attached drawings in which.

Figures 4, 4A, 5, 6, 7, 8, 9, 10:
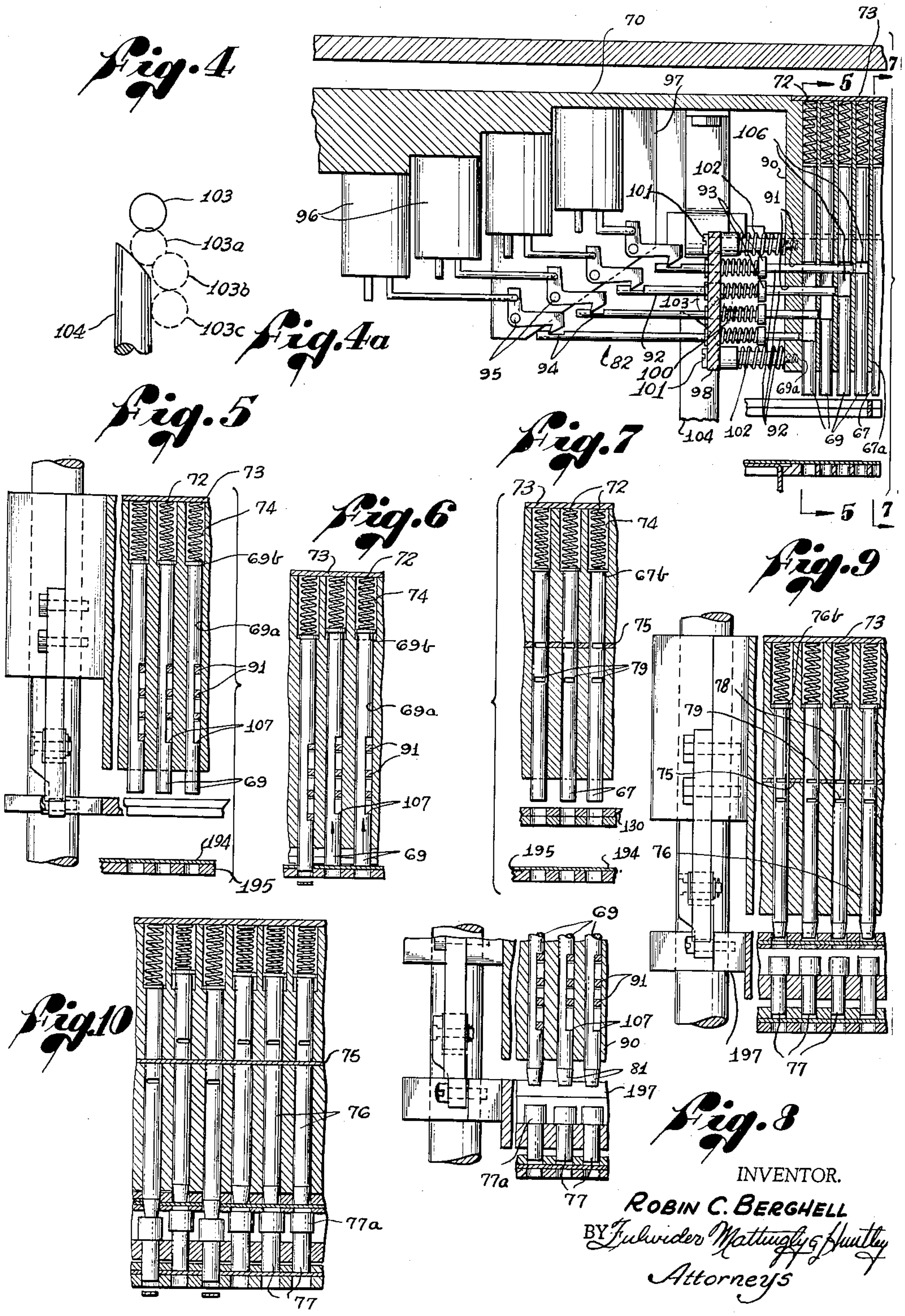
Figure 4 is an enlarged portion of the parts as shown in Figure 1 with portions broken away to show the underlying parts.

Figure 4*a* is a diagrammatic view showing sequential operational positions of certain parts shown in Figure 4.

Figure 5 is a vertical section taken on the line 5—5 of Figure 4;

Figure 6 is a fragmentary view of Figure 5 showing the parts in a different position;

Figure 7 is a vertical section taken on the line 7—7 of Figure 4;

Figure 8 is an elevational section similar to Figure 5; however, showing an alternative embodiment of the present invention;

Figures 9 and 10 are sequential operational views being elevational sections similar to Figure 7; however showing an alternative arrangement of the present invention.

In the drawings, the punch unit is designated generally by the reference character 50. The fixed portion of the unit 50 will be seen to comprise a horizontal base 51 supporting four vertical posts 52, which in turn support a motor platform 53 on their upper ends. An external housing 54 encloses the entire unit and has an opening 55 in the right hand end, which opening is closeable by a vertically sliding door 56 provided with an operating handle 57. Master cards and blank cards to be punched are inserted and removed through the opening 55 by raising the door 56.

Below the opening 55 is a slidable drawer or tray member 58, that is arranged to catch and enable removal of the punchings from blank record cards. Mounted on the right-hand-end of the housing 54 immediately above the opening 55 is an operating switch lever 60, which may be rotated to "punch" positions. Normally the operating lever 60 is in a vertical or "off" position.

The punching operation hereinafter described involves punching all the holes to be punched in a card during a single operation by using a gang punch comprised of a plurality of pins 67 and 69 arranged in banks in the unit 50. All of the pins 67 and 69 are carried on a punch carriage 70, which is a generally-horizontal frame structure supported for vertical sliding movement on the posts 52 by four bearing sleeves 66, arranged at the four corners of the carriage 70.

Figure 1:
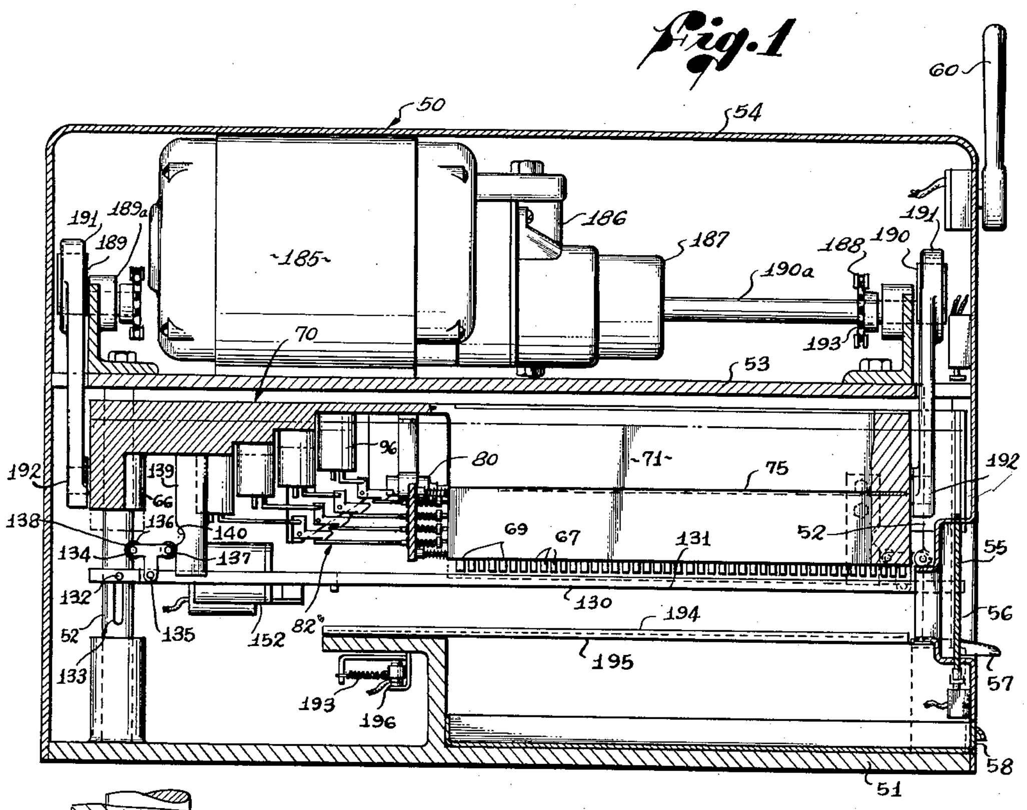
Figure 1 is an elevational sectional view of a card punching unit embodying the present invention.

The array of pins 67 and 69 is supported in a generally rectangular pin box 71 with the lower or punching ends of the pins 67 and 69 projecting below the surface of the pin box 71, as shown in Figure 1. As shown and described in the above-referenced co-pending patent application, a record card produced by the punching unit 50 carries information in the form of a number of vertical columns containing punched holes located at various positions in the column. The number and positions of holes in any particular column is an indication of the numerical digit or letter indicated in that column. The punch pins 67 and 69 are provided in the pin box 71 to punch holes in all the possible positions in such a record card.

As can best be seen in Figures 4 through 7, the punch pins 67 and 69 are each carried in a vertical bore 67a and 69a in the pin box 71, and each is biased downwardly by a compressed spring 72, contained in the upper portion of the bores 67a and 69a, the upper ends of the springs 72 being anchored against a cover plate 73 secured to the upper surface of the pin box 71. Each of the punch pins 67 and 69 have heads 67b and 69b respectively formed on their upper ends to limit the downward movement of the pin urged by the springs 72, the head moving in a vertically broached enlarged portion 74 of each bore.

As can best be seen in Figures 8 through 10, an alternative arrangement may be provided for the structure of the pins 67 and 69. In the alternative arrangement, the pins 67 and 69 are divided into two segments. The upper segments 76 set the pattern for the data to be punched, while the lower segments 77 actually perform the punching operation upon being driven by the upper segments. The operation of the pins 67 and 69 in both embodiments is similar except that if pins are unitary, they serve both to set the data to be punched and to perform the actual punching; however, if divided pins are employed, then one set of segments sets the data to be punched and engage other segments which actually perform the punching operation.

During the punching operation, the pins 67 are locked in either of two positions, i.e. a non-punching or "up" position or a "down" position in which that particular pin causes a hole to be punched in the blank card when the punch carriage 70 is moved downwardly.

The locking function just described is performed by a horizontally-slidable locking plate 75 mounted within the body of the pin box 71. The locking plate 75 extends over the entire horizontal cross-sectional area occupied by the pins 67 and is perforated at appropriate points to permit the passage of the punch pins therethrough. Each of the punch pins 67 has formed therein a pair of lateral notches 78 and 79 so positioned that if the locking plate is moved laterally, an edge of the aperture in the locking plate will enter a notch and prevent further vertical movement of such a pin with respect to the bore in which it is carried.

Since the heads 67b and 69b on the upper ends of each of the pins 67 and 69 and the broached bore in which such heads are carried are flattened on the sides, the pins 67 and 69 cannot rotate in the bore and thus the notches 78 and 79 are maintained on the same side of each respective pin at all times. Thus, it may be seen, that by moving the locking plate 75 horizontally, the pins 67 are all locked in their then positions and are held in either "up" or "down" position depending in each case upon whether the particular pin was up or down when the locking plate was actuated. As will be described in more detail hereinafter, at the time the locking plate 75 is moved, the various pins have been moved to and are held in either up or down position by contact either with the master card or with other means to be described.

The locking plate 75 is actuated by a solenoid 80 (shown in Figure 1) which when energized moves the plate longitudinally to the left (in Figure 1) to lock the pins as described above. The plate 75 is normally held in its unlocked position by a return spring (not shown) of the solenoid 80.

In the operation of the unit 50, certain variable information, e.g. time, may be punched by the pins 69. These pins are controlled by a pin-setting assembly 82. The details of the pin-setting assembly 82 are best seen in Figure 4. The assembly 82 includes a block 90 having formed therein a plurality of parallel lateral bores 91. Positioned in each of the lateral bores 91 is a passage-blocking slide 92 which may take the form of longitudinal rods. The passage-blocking slides 92 each carry a collar 93 which is rigidly affixed to the slides. The passage-blocking slides 92 pass through an array of bores in a spring pressure plate 98. Springs 100 are then positioned between the spring pressure plate and the collars 93. The left end of each of the passage-blocking slides carries a notch 94 engaged by a latch 95. The latches 95 are pivotally attached to a plate 97 and are controlled by solenoids 96 which, at the time the device is to be used, are energized in accordance with various electrical signals that may be provided, for example, from various electrical digital counters or registers well known in the art. Thus, the solenoids are selectively energized according to a pattern representing certain intelligence which is to be recorded on a punched card.

The spring pressure plate is slidably carried upon studs 101 which are rigidly affixed to the block 90. The plate 98 is urged to the left by springs 102 which are compressed between the block 90 and the spring pressure plate 98. A roller 103 is affixed to each end of the spring pressure plate 98 in such manner that each of the rollers engages a respective one of a pair of fixed abutments 104 as the carriage 70, carrying the pressure plate, is moved downwardly (see Figure 4a) thereby causing the roller 103 and the pressure plate 98 to be urged to the right carrying with it the passage-blocking slides 92 that are not latched by the latches 95. The path of the roller 103 as it moves downwardly is indicated at 103a, 103b, 103c, in Figure 4a. (Only one of the rollers 103 and its respective abutment 104 is shown in the drawings.) The passage blocking slides 92 operate in grooves 106 of the pins 69 to engage shoulders 107.

Figure 3:
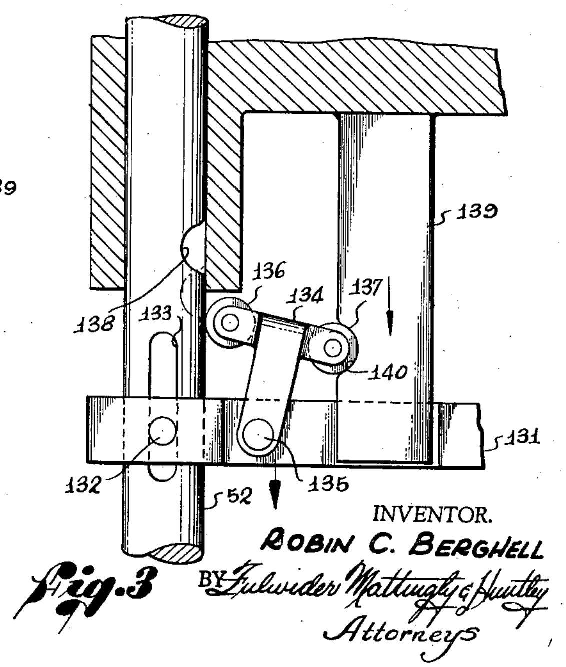

Turning now to a discussion of the master card support assembly, reference will be had to Figure 1. In the punching operation of the unit 50, the pins 67, as above stated, are pre-set in their desired arrangement by contact with a master card or similar apparatus. The master card may be of the type shown and described in the above-referenced patent application wherein coded data are punched in a plurality of areas. The master card, as well as other cards which may be utilized to determine the data to be punched, is supported on a master card support plate 130, which is horizontally disposed immediately below the punch carriage 70 in a frame 131. The frame 131 is held by a key 132 into a key way 133 in the post 52. The frame 131 is vertically slidable relative to the posts 52 and during quiescent periods is held in an upper position by a toggle 134 pivotally attached to the frame 131 at a point 135. The toggle 134 is generally of T-shaped configuration and carries rollers 136 and 137, at its horizontal tips. The roller 136 bears against the column 52 and at one position falls into a recess 138 in the column. The roller 137 bears against a rod member 139 and may fall into a radius or recess 140 when a certain relationship exists between the members. When the roller 137 of the toggle falls into the recess 140, then the roller bears against the post 52 as shown in Figure 3.

Figure 2:
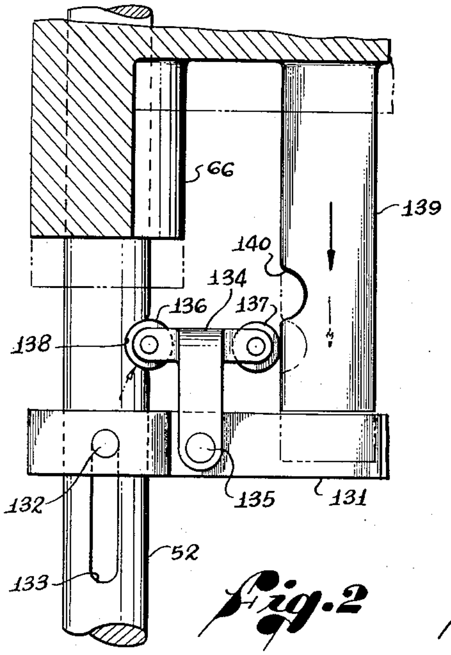
Figures 2 and 3 are sequential operational views being enlarged fragmentary views of Figure 1.

It may be seen that when the roller 136 is engaged in the recess 138 (as shown in Figure 2), the frame 131 is locked to the post 52, while the rod 139 (affixed to the punch carriage 70) is free to move relative to the post 52. When the roller 137 is engaged in the recess 140, the frame 131 and the punch carriage 70 are interlocked, but can move relative to the post 52. As a result, the punch carriage 70 is permitted to travel a limited distance relative to the frame 131 and the post 52, thereafter, the carriage 70 and the frame 131 are interlocked and travel together upon the post 52. It is during the initial travel of the carriage 70 relative to the frame 131 that the pins 67 are set. Thereafter, the frame 131 and the carriage 70 travel together to perform the punching operation.

Vertical movement of the frame 131 is limited by the closed keyway 133. The master card support plate 130 is supported in horizontal tracks (not shown) which are formed in the frame 131 so that the plate may be slid longitudinally through the opening 55 for the purpose of positioning the master card or other punched cards on the support plate and for removing such cards after the punching operation.

It is to be understood that in accordance with the teachings of the above-referenced patent application, the pins 67 are variously set in accordance with the cards placed on the master card support plate 130, and that the pins 69 are set in accordance with the electrical signals applied to the solenoids 96. The information punched in a card therefore comprises both static data, recorded by the pins 67, and continually-changing data, recorded by the pins 69. Of course, the actual form for the cards punched may be varied in accordance with various standards or other considerations, just as the number, size and shape of pins 67 and 69 may be varied in particular embodiments of the proposed machine.

The master card support plate 130 may be held firmly in position during the punching operation by a permanent magnet (not shown). A mechanical coupling is provided between the solenoid 152 and the master card support plate 130 which causes the master card support plate to be ejected when the solenoid 152 is energized at the completion of the punching operation.

The operation cycle herein described, once initiated, by the manual control lever 60 is entirely automatic and is electrically powered. The drive assembly for effecting the downward punching movement of the punch carriage 70 is mounted on the motor plate 53 (see Figure 1) and comprises an electric motor 185, a gear reduction 186, an electrically-actuated single revolution clutch 187, and a sprocket drive assembly 188 connected to synchronously drive a pair of eccentrics 189 and 190. The eccentrics 189 and 190 are mounted on shafts **189*a* and 190*a*, respectively, and are connected by connecting rods 191 and wrist pins 192 to the opposite ends of the punch carriage 70. Thus it will be seen, that each revolution of the eccentrics 189 and 190 causes a single cycle of downward and upward movement of the punch carriage 70**.

The single-revolution clutch 187 is the conventional type which when actuated, engages the drive for a single revolution at the completion of which the clutch 187 is automatically disengaged. Clutches of this type are well known in the prior art.

In the operation of the punch 50, an electrical switching circuit is provided which energizes the motor 185, and the various solenoids in the punch in a proper sequence as will be hereinafter described. A satisfactory form for this switching circuit is shown and described in the above-referenced co-pending patent.

In the operation of the unit 50, an operator raises the door 56, places master card on plate 130 and pushes the plate into the unit. The operator then slides a blank record card 194 into position upon its support plate 195, so that the blank card 194 moves a card ejection member 193 into latched position. The door 56 is then closed, and the lever switch 60 is moved to a "punching" position, setting into operation the mechanism for causing the punch carriage 70 to move downwardly in its punching cycle.

At the time that the lever switch 60 is moved to a "punching" position the solenoids 96 (Figure 4) have, as previously stated, been energized in a particular pattern to indicate the variable information to be punched by the pins 69. The solenoids 96 which are energized, unlatch latches 95 from lips 94 in the passage blocking slides 92. As the punch carriage 70 moves downwardly, the rollers 103 engage the fixed abutments 104 thereby forcing the spring compression plate 98 to the right, compressing the springs 102 mounted upon the studs 101. In moving to the right, the spring pressure plate carries with it those passage-blocking slides 92 which are not latched by latches 95. The springs 100 upon the unlatched passage blocking slides 92 remain uncompressed and urge the passage blocking slides 92 to the right over a shoulder 107 in certain of the punch pins 69. Thus, the unlatched slides 92 are all shifted simultaneously in position to block movement of selected pins 69.

The passage-blocking slides 92 which are latched by the latches 95 remain stationary while the collars 93 compress the springs 100. It may therefore be seen, that depending upon which of the solenoids 96 are energized, certain of the pins 69 are set by having a passage-blocking slide 92 positioned immediately above a shoulder 107 formed in the pins 69. The pins 69 which have a passage-blocking slide 92 positioned against a shoulder 107 are not withdrawn into the pin box 71, and therefore upon encountering the blank card, punch holes in the card. However, those pins 69 which do not have a passage-blocking slide 92 positioned against a shoulder 107 are forced into the pin box 71 by encountering the blank card which causes the springs 72 to be compressed.

Consider now the pins 67. As the punch carriage 70 moves downwardly from the initial position the rod member 139 (Figure 1) affixed to the carriage moves downward relative to the toggle 134 to a position at which the roller 137 of the toggle 134 falls into the recess 140. Refer to Figure 2, which shows the position of the mechanism immediately prior to the time when the roller 137 engages the recess 140 of the rod member 139. It is to be noted, that prior to this engagement, the frame 131 holding the master card support plate 130 is locked with respect to the columns 52. Therefore, relative movement takes place only between the punching carriage 70 and the frame 131. As a result, those pins 67 which are positioned above holes in the cards of the master card support plate 130 pass through these holes and remain extended from the pin box 71. However, those pins 67 which engage no holes are retracted into the pin box 71 by compression of the springs 72. In this manner, the pins 67 are set relative to the pin box 71 to determine which holes will be punched in the card 194.

When the punch carriage 70 has moved downwardly through a certain distance, the rod member 139 that is affixed to the punch carriage 70 becomes positioned so that the roller 137 of the toggle 134 falls into the recess 140. Upon this occurrence, the toggle 134 is pivotally moved to the right to withdraw the roller 136 from the recess 138 in the column 52. As a result, the rod member 139 (rigidly affixed to the punch carriage 70), is locked to the frame 131. This locked condition is best shown in Figure 3.

As a result of the frame 131 being locked to the punch carriage 70, the forces exerted by the compressed springs 72 are supported by the toggle 134. That is, in previous embodiments of punching apparatus, it has been necessary to provide a substantial force to overcome the numerous compressed springs plus the force necessary to pierce the record card. However, according to the present invention, these forces are separated so that the entire force need not be supplied at one time by the motor 185.

When the frame 131 is locked to the carriage 70, the locking plate 75 is moved to the left to engage the lateral notches 78 and 79 then aligned with the locking plate 75. The punch carriage 70 and the frame 131 then continue a downward movement with certain of the pins 67 set and locked in an extended position and certain of the pins 67 in a withdrawn position. Of course, the pins 69 are all extended; however some are free to move into the pin box 71 while others are fixed against such movement.

When the pins 67 that are locked in an extended position, engage the blank card 194, they pierce the blank card 194 to pass into holes, i.e. dies in the support plate 195, thereby punching the desired static information into the card 194.

The pins 69 upon contacting the card 194 are either urged back into the pin box 71, or pierce the card 194. Those pins 69 which may not be urged into the pin box, due to the pressure-blocking slide 92 engaging a shoulder 107 of the pins, punch holes in the card 194. While those pins 69 which are not held in an extended position are retracted into the pin box 71 and do not pierce the card 194.

After the card 194 has been punched and the carriage 70 has completed its downward travel, the carriage reverses its direction of movement to be moved away from the card 194. As this movement occurs, the acting pins 67 and 69 are stripped from plate 195 and the card 194 because these pins are held by heads 67*b* and 69*b* against further downward movement. As the punch carriage 70 continues to move upwardly it is held locked to the frame 131 until the key 132 reaches the end of the keyway 133. Upon this occurrence, frame 131 is stopped and the recess 138 in the vertical post 52 simultaneously receives the roller 136. As the roller 136 is moved into the recess 138, the toggle 134 is moved to the left so that the roller 137 is disengaged from the recess 140 thereby allowing the rod member 139 and the punch carriage 70 to continue moving upwardly. At a position near that when the frame 131 and the carriage 70 are unlocked, the locking plate 75 is moved to release the locked pins 67. As a result, the pins previously locked in a withdrawn position in the pin box 71 are permitted to move out of the pin box 71 as the box raises relative to the frame 131.

The completion of the cycle of operations occurs when rollers 103 move above the fixed abutment 104 (Figure 1) allowing the spring pressure plate 98 to return to its quiescent (left) position and thereby withdrawing passage-blocking slides 92 from their blocking positions. As the operative passage-blocking slides move to the left, they fall under the latches 95 and are again latched in their initial positions.

During the final operation of the punch, the solenoid 152 is operated to urge the master card support plate 130 from its locked position. Also at this point the solenoid 196 is operated releasing the blank card ejection member 193.

The Figure 9, as previously indicated is a showing similar to Figure 7, while Figure 8 is a showing similar to Figure 5; however, pins 67 are divided into segments 76 and 77, and pins 69 into segments 81 and 77. That is, the upper segments 76 and 81 of pins 67 and 69 are set in accordance with the previous-described mode of operation. After the upper segments 76 and 81 are set, rather than to directly engage and punch the blank card, these segments engage the lower punch pin segments 77 which perform the punching operation. The provision of segmented pins has in some instances certain advantages over the unitary pins which both sense and punch depending on the application.

It is to be noted, that the lower segments 77 are held in a rack 197 which is mounted and functions in a manner similar to the frame 131. As a result, after a blank card has been punched the segments 77 are stripped from supporting plate 195 and from the punched card 194 by the rack 197, while being pulled upward by action of carriage 70, which engages heads 77*a* of the segments 77.

An important feature of the present invention resides in the lock-latch mechanism incorporating the toggle 134 which enables the interlocking of two members over a portion of their travel, and also permits one of the members to travel independent of the other while the second is locked in position.

Another important feature of the present invention resides in the manner of punching the variable-information section of a punch card. That is, in the apparatus by which the pins 69 are selected by the passage-blocking slides 92 to punch out selected holes in an information card. It is to be noted that this apparatus is contained entirely upon the carriage 70, and moves with the carriage.

While the punching unit 50 shown and described herein is fully capable of achieving the objects and providing the advantages herein stated, it will be realized that the mechanisms are capable of considerable rearrangement and modification without departing from the spirit of the invention. For this reason, the invention is not to be limited to the precise form and arrangement shown and described but rather to the scope of the appended claims.

I claim:

1. An apparatus for preparing records of the type in which information is recorded in the form of a pattern of punched holes which apparatus comprises: a punch carriage mounted for movement in a given path; a plurality of pins on said carriage and independently movable with respect thereto between punching and non-punching positions; setting means having a predetermined pattern of passages, each adapted to pass one of said pins and positioned in the path of said carriage whereby initial movement of said carriage impinges said pins against said setting means to retract to non-punching position such pins as are not aligned with one of said passages; means for interlocking said punch carriage and said setting means against relative movement except during said initial movement of said carriage; and means to support a blank record in the path of said carriage whereby said pins will cause said record to be punched.

2. An apparatus for preparing records of the type in which information is recorded in the form of a pattern of punched holes which apparatus comprises: a punch carriage mounted for movement in a given path; a plurality of pins on said carriage and independently movable with respect thereto between punching and non-punching positions; setting means for engaging and setting certain of said pins in a punching position; means to support a blank record so that during a portion of the movement of said carriage, said pins in punching position will cause said record to be punched; and means for interlocking said punch carriage and said setting means during said portion of the movement of said carriage when said record is punched.

3. An apparatus according to claim 2 wherein said pins comprise a first segment for encountering said setting means to be set in a predetermined position; and a second segment to be acted upon by said first segment to perform the punching operation.

4. An apparatus according to claim 2 wherein said pins are unitary and encounter said setting means to be set and thereafter perform the punching operation.

5. An apparatus for preparing records of the type in which information is recorded in the form of a pattern of punched holes which apparatus comprises: a punch carriage mounted for movement in a given path; a plurality of pins on said carriage and independently movable with respect thereto between punching and non-punching positions; a plate member, transversely movable relative to said pins; a plurality of blocking members yieldably attached to said plate member; locking means for selectively locking certain of said blocking members in a fixed position in accordance with information to be recorded; means for moving said plate as said carriage moves through said given path, to position said blocking members which are not locked by said locking means to engage certain of said pins and set said certain of said pins in a punching operation; and means to support a blank record so that during a portion of the movement of said carriage, said pins in punching position will cause said record to be punched.

6. Apparatus according to claim 5 wherein said plate, said blocking members, and said locking means are attached to said punch carriage to move through said given path.

7. Apparatus according to claim 5 wherein said locking means comprise a plurality of latches, and a plurality of solenoids for controlling said latches in accordance with electrical signals.

8. An apparatus according to claim 5 wherein said pins comprise a first segmentf or engaging one of said blocking members, and a second segment to be acted upon by said first segment to perform the punching operation.

9. An apparatus for preparing records of the type in which information is recorded in the form of a pattern of punched holes which apparatus comprises: a punch carriage mounted for movement in a given path; a plurality of pins on said carriage and independently movable with respect thereto between punching and non-punching positions; first setting means having a predetermined pattern of passages, each adapted to pass one of said pins and positioned in the path of said carriage whereby initial movement of said carriage impinges certain of said pins against said first setting means to retract to non-punching position such certain of said pins as are not aligned with one of said passages; second setting means for setting other of said pins in a punching relationship in accordance with variable information; means for interlocking said first setting means and said punch carriage against relative movement except during said initial movement of said carriage; and means to support a blank record in the path of said carriage whereby said pins will cause said record to be punched.

10. An apparatus according to claim 9 wherein said second setting means comprises: a plate member, transversely movable relative to said pins; a plurality of blocking members yieldably attached to said plate member; locking means for selectively locking certain of said blocking members in a fixed position, in accordance with information to be recorded; and means for moving said plate as said carriage moves through said given path, to position said blocking members which are not locked by said locking means to engage certain of said pins and set said certain of said pins in a punching position.

11. A mechanism for operation in conjunction with first and second traveling members which operate relative to a stationary member comprising: a toggle pivotally attached to said first traveling member; a first engaging member attached to said stationary member and positioned to engage said toggle when said toggle is in one position and said first traveling member and said stationary member are in predetermined relative positions, and to otherwise provide a bearing surface to maintain said toggle in another position; and a second engaging member attached to said second traveling member and positioned to engage said toggle when said toggle is in said other position and said first traveling member and said second traveling member are in predetermined relative positions, and to otherwise provide a bearing surface to maintain said toggle in said one position.

12. Apparatus according to claim 11 wherein said toggle comprises a generally T-shaped member having rollers mounted to engage said engaging members.

13. A mechanism for operation in conjunction with first and second traveling members which operate relative to a stationary member comprising: a toggle pivotally attached to said first traveling member; a first engaging member attached to said stationary member and positioned to engage said toggle when said toggle is in one position and said first traveling member and said stationary member are in predetermined relative positions, and to otherwise provide a bearing surface to maintain said toggle in another position; a second engaging member attached to said second traveling member and positioned to engage said toggle when said toggle is in said other position and said first traveling member and said second traveling member are in predetermined relative positions, and to otherwise provide a bearing surface to maintain said toggle in said one position; and means for limiting the extent of travel of said first traveling member.

14. An apparatus for preparing records of the type in which information is recorded in the form of a pattern of punched holes which apparatus comprises: stationary means to support a blank record; a punch carriage mounted for movement in a given path relative to said stationary means; a plurality of pins on said carriage and independently movable with respect thereto between punching and non-punching positions; setting means having a predetermined pattern of passages, each adapted to pass one of said pins and positioned in the path of said carriage whereby initial movement of said carriage impinges said pins against said setting means to retract to non-punching position such pins as are not aligned with one of said passages; and means for interlocking said punch carriage and said setting means against relative movement except during said initial movement of said carriage, whereby said pins set in a punching position will punch holes in said record.

15. An apparatus for preparing records of the type in which information is recorded in the form of a pattern of punched holes which apparatus comprises: stationary means to support a blank record; a punch carriage mounted for movement in a given path relative to said stationary means; a plurality of pins on said carriage and independently movable with respect thereto between punching and non-punching positions; setting means having a predetermined pattern of passages, each adapted to pass one of said pins and positioned in the path of said carriage whereby initial movement of said carriage impinges said pins against said setting means to retract to non-punching position such pins as are not aligned with one of said passages; a toggle pivotally attached to said setting means; a first engaging member attached to said stationary means and positioned to engage said toggle when said toggle is in one position and said setting means and said stationary means are in a predetermined relative position, and to otherwise provide a bearing surface to maintain said toggle in another position; and a second engaging member attached to said punch carriage and positioned to engage said toggle when said toggle is in said other position and said punch carriage and said setting means are in a predetermined relative position, and to otherwise provide a bearing surface to maintain said toggle in said one position, whereby said pins set in a punching position will punch holes in said record.

16. In a punching apparatus whereby a plurality of pins in a carriage are set in a punching position and said carriage is moved in a given path relative to a record support to thereby punch holes in a record positioned upon said record support, a means for setting said pins comprising: a plate member, transversely movable relative to said pins; a plurality of blocking members yieldably attached to said plate member; locking means for selectively locking certain of said blocking members in a fixed position, in accordance with information to be recorded; and means for moving said plate as said carriage moves through said given path, to position said blocking members which are not locked by said locking means to engage certain of said pins and set said certain of said pins in a punching position.

17. An apparatus for preparing records of the type in which information is recorded in the form of a pattern of punched holes which apparatus comprises: a punch carriage mounted for movement in a given path; means for driving said punch carriage through a reciprocating cycle; a plurality of pins on said carriage and independently movable with respect thereto between punching and nonpunching positions; setting means for engaging and setting certain of said pins in a punching position; means to support a blank record so that during a portion of the movement of said carriage, said pins in punching position will cause said record to be punched; and means for holding said setting means in a fixed position during the initial and final movement of said carriage, and to otherwise lock said setting means to said carriage.

18. Apparatus for preparing records of the type in which information is recorded in the form of a pattern of punched holes, comprising: a punch carriage mounted for movement in a given path; a plurality of pins on said carriage, each independently movable with respect thereto between punching and non-punching positions; a pressure member, transversely movable relative to said pins; a plurality of blocking members yieldably attached to said pressure member; latch means including a plurality of separate elements to engage respective blocking members and thereby hold said blocking members immovable with respect to said punch carriage; means for selectively disengaging predetermined elements in said latch means to thereby render the predetermined respective blocking members movable with respect to said punch carriage; means for moving said pressure member as said carriage moves through said given path, to position said blocking members which are not held as aforesaid to engage certain of said pins and set said certain pins in a punching position; and means to support a blank record so that during a portion of the movement of said carriage, said pins in punching position will cause said record to be punched.

19. Apparatus according to claim 18 wherein said means for selectively disengaging said locking means comprises a plurality of solenoids adapted to be selectively energized.

20. In tabulating card punching apparatus of the type in which a plurality of punch pins are independently mounted for movement between punching and non-punching positions in a carriage and said carriage is also movable toward a record blank to punch a pattern of holes therein, said pattern being determined by setting certain of said pins into punching position in said carriage, setting means comprising: pressure means mounted on said carriage and movable therein to and from a pin-blocking position; a plurality of pin-blocking members each independently yieldably attached to said pressure means for movement therewith to block movement of a respective pin in said carriage when said pressure means is moved to pin-blocking position; means to move said pressure member into said pin-blocking position; latching means including a plurality of independent and selectively operable elements each adapted to lock and unlock a respective one of said pin-blocking members against said movement with said pressure member; and means to actuate pre-selected members in said latching means whereby when said pressure member is moved as aforesaid only a pre-selected group of said pins is set to punch holes when said carriage is moved as aforesaid.

21. Apparatus for preparing records of the type in which information is recorded in the form of a pattern of punched holes, which apparatus comprises: a punch carriage mounted for movement in a given path; a plurality of pins on said carriage each independently movable with respect thereto between punching and non-punching positions; setting means located at a given intermediate point in said path for engaging and setting certain of said pins in punching position during a portion of the movement of said carriage moved as aforesaid; releasable locking means to immobilize said setting means during said pin-setting portion of said carriage movement; means to release said locking means when said pins are set as aforesaid whereby to permit said setting means thereafter to move with said carriage; and means to support a blank record in said carriage path to be punched by said pins set in punching position as aforesaid.

22. Apparatus for preparing records of the type in which information is recorded in the form of a pattern of punched holes which apparatus comprises: a punch carriage mounted for reciprocal movement between opposite limits in a given path; a plurality of pins on said carriage each independently movable with respect thereto between punching and nonpunching positions; setting means located in a given point in said path intermediate said limits for engaging said pins and setting certain of said pins to punching positions during a portion of the movement of said carriage when moved as aforesaid; releasable locking means to immobilize said setting means during said pin-setting portion of said carriage movement; means to release said locking means and permit movement of said setting means with said carriage after said pins are set as aforesaid; means adjacent one of said limits to support a record blank in said path to be punched by said pins set as aforesaid when said carriage approaches said last named limit; and means to inter-engage said carriage and setting means to return the latter to said given point when said carriage returns from said last named limit.

References Cited in the file of this patent

UNITED STATES PATENTS

| | | |
|---|---|---|
| 2,180,058 | Jones | Nov. 14, 1939 |
| 2,803,187 | Hart et al. | Aug. 20, 1957 |